United States Patent [19]

Ikeda

[11] Patent Number: 5,376,268

[45] Date of Patent: Dec. 27, 1994

[54] ROTARY FILTERING APPARATUS

[75] Inventor: Toshio Ikeda, Sagamihara, Japan

[73] Assignee: Nessy Kogyo Kabushiki Kaisha, Sagamihara, Japan

[21] Appl. No.: 43,897

[22] Filed: Apr. 7, 1993

[51] Int. Cl.⁵ .............................................. B01D 33/00
[52] U.S. Cl. .................................. 210/383; 210/297; 210/304; 210/319; 210/354; 210/416.1
[58] Field of Search ............... 210/297, 304, 354, 402, 210/416.1, 413, 512.1, 512.3, 319, 383

[56] References Cited

U.S. PATENT DOCUMENTS

| | | | |
|---|---|---|---|
| 3,363,771 | 1/1968 | Walters | 210/304 |
| 3,443,696 | 5/1969 | Schutte | 210/304 |
| 5,215,650 | 6/1993 | Stoneburner | 210/416.1 |

Primary Examiner—Robert A. Dawson
Assistant Examiner—David Reifsnyder
Attorney, Agent, or Firm—Paul A. Guss

[57] ABSTRACT

A rotary filtering apparatus basically comprises a tank having inner surfaces comprising an upper part which is cylindrical and a lower part which is conical, wherein a diameter thereof decreases toward the lower part of the tank. A sintered metallic filter is centrally disposed in the tank, and a filter rotating mechanism is provided for rotating the sintered metallic filter in one direction. A fluid supply unit supplies polluted water (W1) to the inside of the tank, and a nozzle unit supplies high-pressure water (H) to the tank. A fluid suction unit draws clean water (W2) out of the central portion of the sintered metallic filter. A storage tank is mounted to the lower part of the tank, for storing therein particles separated from the polluted water (W1).

7 Claims, 5 Drawing Sheets

ROTARY FILTERING APPARATUS

BACKGROUND OF THE INVENTION

1. Field of the Invention

This invention relates to a rotary filtering apparatus for separating particles suspended in polluted water such as sewage.

2. Description of the Related Art

Heretofore, various means for separating particles suspended in polluted water such as sewage, for example a sedimentation or settling process effected under the gravity, or a centrifugal separation process made under centrifugal force, etc. have been known. Further, there is also known a flocculation process wherein polluted water is mixed with a flocculant so as to flocculate particles suspended in water into sludge and separate out the sludge.

However, such known sedimentation processes are often inefficient because of the time required for separation of the particles from the polluted water by use of gravity. Filtering process can also be inefficient because of clogging of filters by the suspended particles or the like. It is also difficult to fully and reliably separate suspended particles from the polluted water or sewage by centrifugal force alone. In the case of the flocculation process, there also arises problem of increased cost of the flocculant.

SUMMARY OF THE INVENTION

It is an object of the present invention to provide a rotary filtering apparatus capable of efficiently filtering polluted fluid such as sewage, etc.

According to the present invention, for achieving the above object, there is provided a rotary filtering apparatus for separating particles suspended in a fluid to be filtered, comprising: a tank having inner surfaces whose upper part is cylindrical and lower part is conical with the diameter thereof decreasing toward a lower end of the tank; a filtering member shaped in the form of a cylinder disposed in the central upper part of the tank; a filter rotating mechanism for rotating the filtering member in one direction about the central axis of the cylindrically shaped filtering member; a fluid supply unit for supplying fluid into the tank in a stream substantially tangential to a cylindrical outer surface of the filtering member in a direction opposite to the rotational direction of the filtering member; a nozzle unit for injecting a washing fluid into the tank in a stream substantially tangential to the cylindrical outer surface of the filtering member and in a direction opposite to the rotational direction of the filtering member; and a fluid suction unit for sucking a clean fluid separated from the fluid to be filtered out of the central portion of the filtering member.

The aforementioned apparatus can further comprise a stirrer having a plurality of stirring members, mounted on the bottom face of the cylindrically shaped filtering member, or a storage tank connected to the lower end of the tank, for storing therein the particles separated from the fluid to be filtered. The aforementioned nozzle unit can be mounted to the side wall of the tank at the same height at which the filtering member is installed within the tank, and which is higher than the height at which the stirrer is installed.

In the rotary filtering apparatus according to the present invention, the particles are centrifugally separated from the polluted fluid by a centrifugal flow or stream produced by the polluted fluid, the washing fluid injected from the nozzle unit, or by the action of the stirrer. Thereafter, the particles are collected and stored in the storage tank disposed in the lower part of the tank. The polluted fluid is further filtered by the filtering member disposed at the center of the tank, after which the clean fluid separated from the polluted fluid is discharged to the outside by the fluid suction unit.

The washing fluid is injected from the nozzle unit toward the outer cylindrical surface of the filtering member rotated in a direction opposite to that of the centrifugal stream. Thus, the filtering member can be effectively kept free from clogging, so that the filtering and sucking operations can be performed with high efficiency.

The above and other objects, features and advantages of the present invention will become apparent from the following description and the appended claims, taken in conjunction with the accompanying drawings in which preferred embodiments of the present invention are shown by way of illustrative example.

DESCRIPTION OF THE PREFERRED EMBODIMENTS

Rotary filtering apparatus according to the present invention will hereinafter be described with reference to the accompanying drawings in which preferred embodiments are shown by way of illustrative example.

Figure 1:
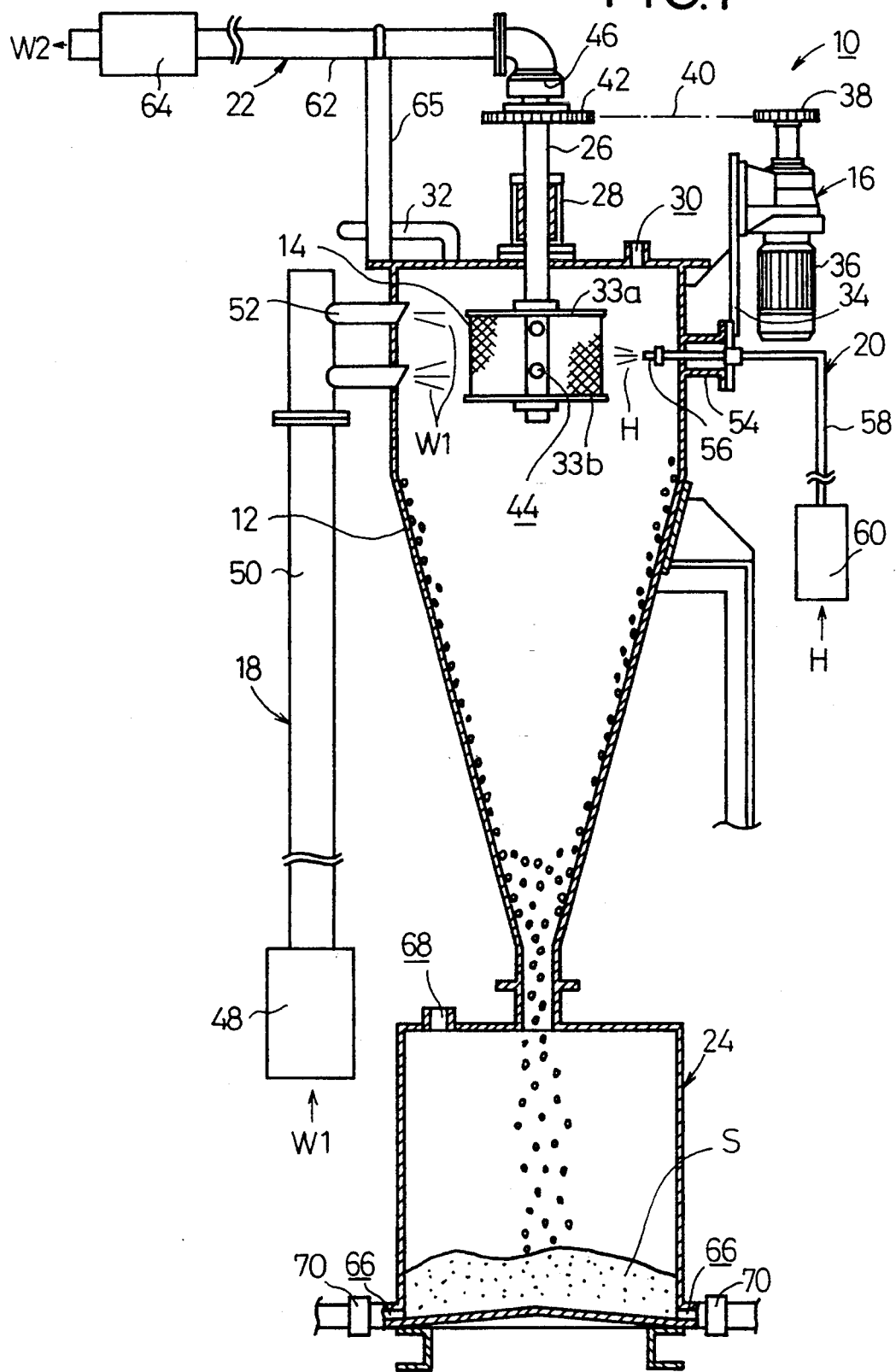
FIG. 1 is a partly-cut vertical cross-sectional view showing a rotary filtering apparatus according to a first embodiment of the present invention.
Figure 2:
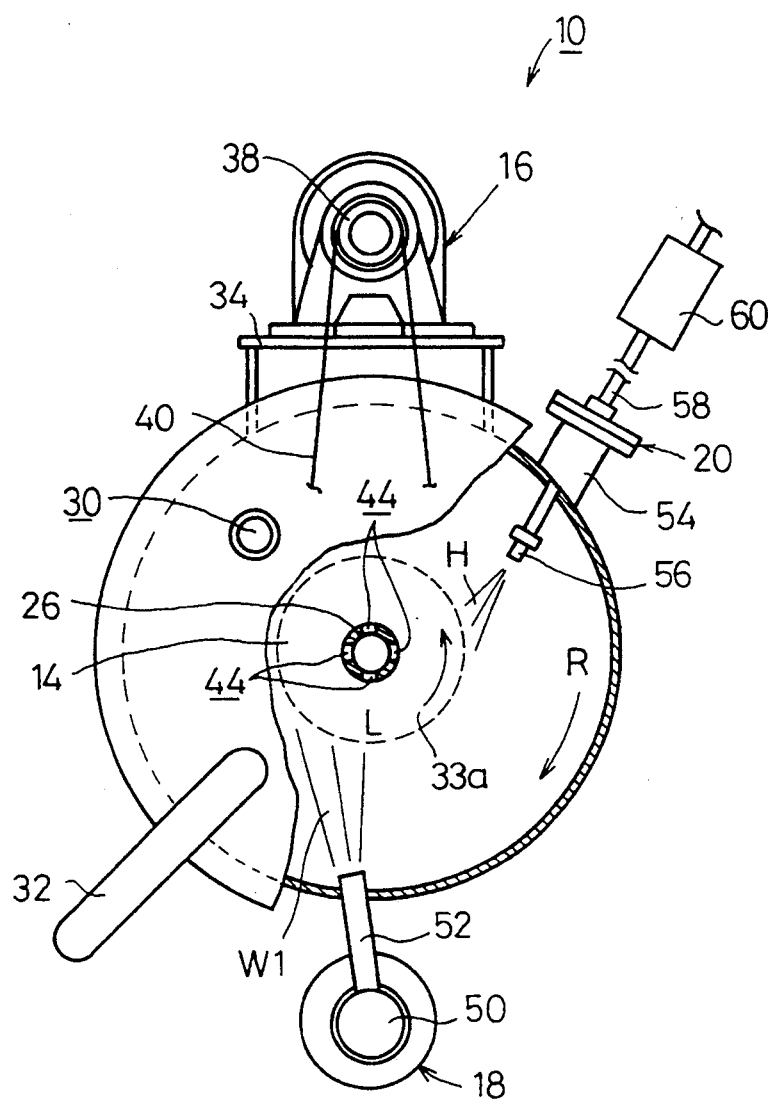
FIG. 2 is a partly-cut transverse cross-sectional view showing the rotary filtering apparatus shown in FIG. 1.

FIG. 1 is a partially-cutaway vertical sectional view illustrating a rotary filtering apparatus 10 according to a first embodiment of the present invention. FIG. 2 is a partially-cut transverse sectional view showing the rotary filtering apparatus 10.

The rotary filtering apparatus 10 basically comprises a tank 12 having inner surfaces comprising an upper part which is cylindrical and a lower part which is conical, the lower part having a diameter decreasing toward the bottom of the tank 12. A sintered metallic filter 14 is disposed in the upper central part of the tank 12 in the form of a cylinder, and a filter rotating mechanism 16 is provided for rotating the sintered metallic filter 14 in one direction about the central axis of the cylindrically formed filter; the apparatus further comprises a fluid supply unit 18 for supplying polluted water W1 into the tank 12, a nozzle unit 20 for injecting high-pressure water H to the tank 12, a fluid suction unit 22 communicating with the central portion of the cylindrically formed sintered metallic filter 14 and serving to suck clean water W2 separated by filtration from the polluted water W1, and an particle storage tank 24 connected to the lower part of the tank 12, for storing therein particles S which have been separated from the polluted water W1.

The tank 12 has a bearing 28 supporting a rotatable shaft 26 for rotating the sintered metallic filter 14 about an axis thereof, the bearing being centrally mounted on the upper surface of the tank 12. A hole 30 is defined in the upper surface of the tank for mounting therein a level meter (not shown) for detecting the level of the fluid stored in the tank 12. Further, the tank 12 has an overflow pipe 32 coupled thereto.

The sintered metallic filter 14 is disposed in the inner central portion of the tank 12 such that the lower end of the rotatable shaft 26 is disposed in the center of the filter 14. The sintered metallic filter 14 is shaped in the form of a cylinder and is mounted about the rotatable shaft 26 by upper and lower mounting plates 33a, 33b.

The filter rotating mechanism 16 comprises a motor 36 with a reduction gear, which is secured to the outer side wall of the tank 12 through a bracket 34. A sprocket 38 is fixed to a drive shaft of the motor 36, and a further sprocket 42 is coupled via a chain 40 to the sprocket 38. The rotatable shaft 26 has an upper end to which the sprocket 42 is fixed. The rotatable shaft 26 is at least partially hollow and has a plurality of holes 44 defined in the side wall of the lower end thereof to which the sintered metallic filter 14 is mounted. The upper end of the rotatable shaft 26 is supported on a connecting portion 46 of the fluid suction unit The fluid supply unit 18 comprises a pump 48 for supplying polluted water W1 to the tank 12, a supply pipe 50, and pipes 52 each coupled to an upper portion of the supply pipe 50. The pipes 52 are mounted to the side wall of the tank 12 at respective heights substantially corresponding to the height of the sintered metallic filter 14 and directed substantially tangential to the outer peripheral surface of the sintered metallic filter 14 (see FIG. 2).

A fixing portion 54 is mounted to the side wall of the tank 12 at the height of the sintered metallic filter 14. A nozzle unit 20 is mounted to the fixing portion 54. The nozzle unit 20 comprises a jet nozzle 56 inserted into the tank 12 through the fixing portion 54 and a pump 60 for supplying the high-pressure water H to the jet nozzle 56 through a pipe 58. The jet nozzle 56 is disposed so as to inject the high-pressure water H in a direction tangential to the outer peripheral surface of the sintered metallic filter 14 (see FIG. 2).

The fluid suction unit 22 comprises a pipe 62 one end of which is fixed to the connecting portion 46 and the other end of which is connected to a pump 64 for sucking clean water W2 filtered from the polluted water W1. The pipe 62 is supported by a post 65 in an upper position over the tank 12.

The particle storage tank 24 is coupled to the lower end of the tank 12. Discharge holes 66 for discharging particles S such as sludge are defined in the side wall of the lower end of the particle storage tank 24. The discharge holes 66 can be opened and closed by respective valves 70 connected thereto.

The central portion of the bottom face of the particle storage tank 24 is bulged upwardly so that the particles S can be easily discharged through the discharge holes 66. Further, a hole 68 for mounting a level meter (not shown) therein is defined in the upper surface of the particle storage tank 24. The valves 70 are mounted in corresponding discharge holes 66.

The rotary filtering apparatus 10 is constructed as described above. The operation of the rotary filtering apparatus 10 will now be described.

When the motor 36 rotates, the rotatable shaft 26 is rotated by the sprocket 38, the chain 40 and the sprocket 42. The sintered metallic filter 14 is rotated in a predetermined direction (i.e., in the direction indicated by "L" in FIG. 2) under the rotation of the rotatable shaft 26. Simultaneously, high-pressure water H is injected from the jet nozzle 56 through the pipe 58 by the pump 60 so as to travel and impinge tangentially to the outer periphery of the sintered metallic filter 14.

While operating as described above, polluted water W1 including particles S therein is supplied to the tank 12 through the supply pipes 50 and the pipe 52 by the pump 48. The supplied polluted water W1 is injected into the tank in a direction substantially tangential to the outer periphery of the sintered metallic filter 14. The polluted water W1 in the tank 12 flows at a high speed centrifugally along the inner wall surface of the tank 12 in a direction indicated by "R") which is opposite to the direction L, as shown in FIG. 2. Thereby a synergic effect occurs between the high-pressure water H injected from the jet nozzle 56 and the polluted water W1 injected through the pipes 52.

The centrifugal force acting on the polluted water W1 separates the particles S from the polluted water W1 due to the difference in specific gravity between the particles S and water and owing to the centrifugal movement of the stream in the R direction referred to above. The particles S reach the inner peripheral wall of the cylindrical tank 12 and fall along the wall to the lower part of the tank 12. Thus, the particles S are introduced into the particle storage tank 24 through the lower part of the tank 12. The amount of collected particles S can be confirmed by a level meter (not shown) mounted in the hole 68 of the tank 24, and then the particles are discharged through the discharge holes 66 defined in the lower end of the storage tank 24.

On the other hand, inside the sintered metallic filter 14, a negative pressure is developed by the suction of clean water through the holes 44 and through the pipe 62 into the pump 64. Thus, clean water from which the particles S have been removed by centrifugal force, is sucked into the sintered metallic filter 14 leaving fine partices captured on the sintered metallic filter 14. Then, the clean water W2 is discharged to the outside through the pipe 62.

At this time, since high-pressure water H is also sprayed onto the outer peripheral surface of the sintered metallic filter 14 from a direction substantially opposite to the direction of rotation of the sintered metallic filter 14, no clogging is developed in the sintered metallic filter 14. It is therefore unnecessary to effect maintenance on the rotary filtering apparatus 10, such as regular filter cleaning. As a result, the rotary filtering apparatus 10 can be kept operative over a long period of time.

If the polluted water W1 is mixed with a flocculant or coagulating agent so that the particles S are flocculated to some extent in advance, and such processed polluted water W1 is supplied to the tank 12, then the particles S car, be more efficiently separated from the polluted water W1.

A description will next be made of a rotary filtering apparatus according to a second embodiment. The structural elements which are substantially identical to those employed in the first embodiment are identified by like reference numerals and their detailed description will therefore be omitted.

Figure 3:
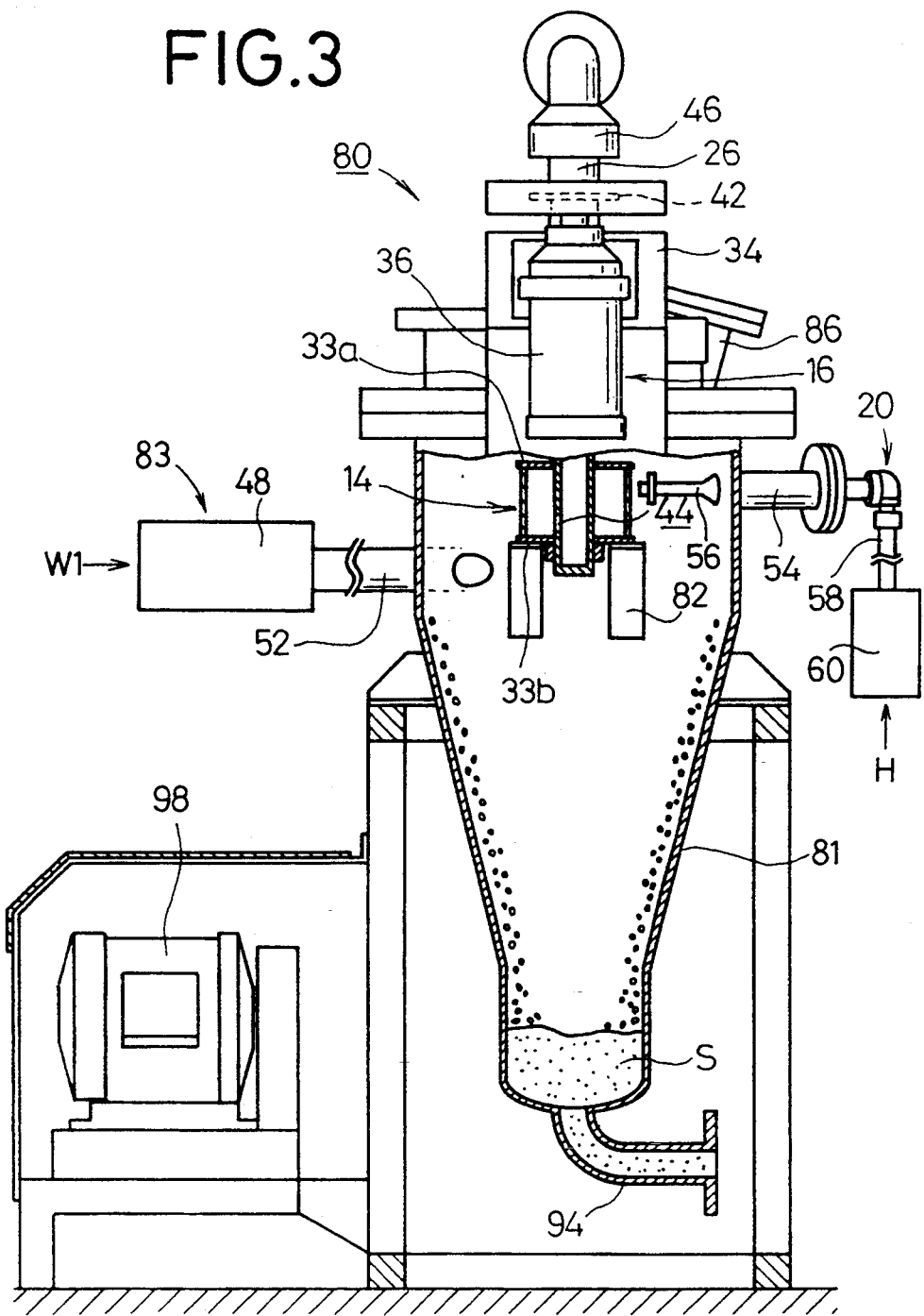
FIG. 3 is a partly-cut vertical cross-sectional view showing a rotary filtering apparatus according to a second embodiment of the present invention.
Figure 4:
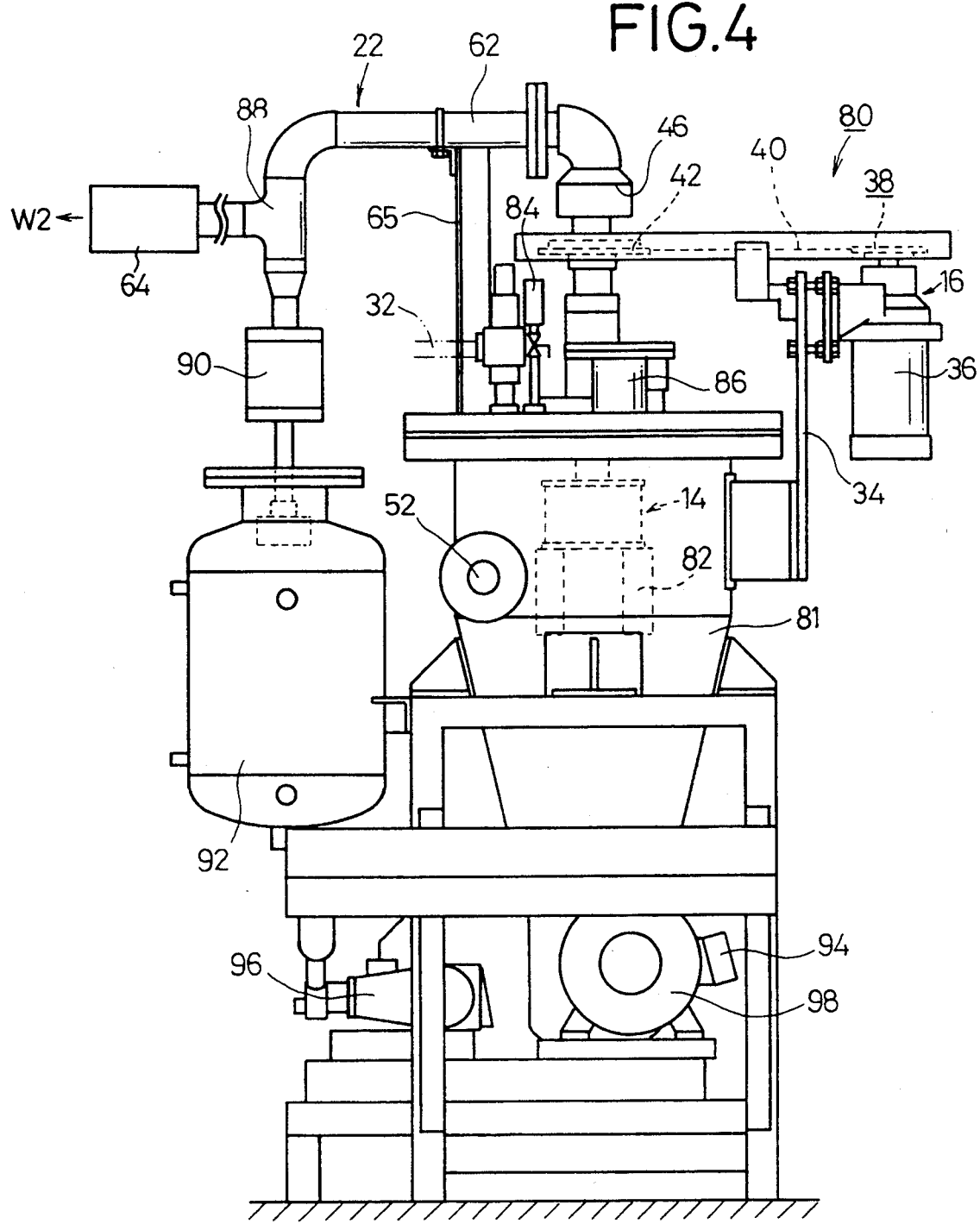
FIG. 4 is a side view illustrating the rotary filtering apparatus shown in FIG. 3.
Figure 5:
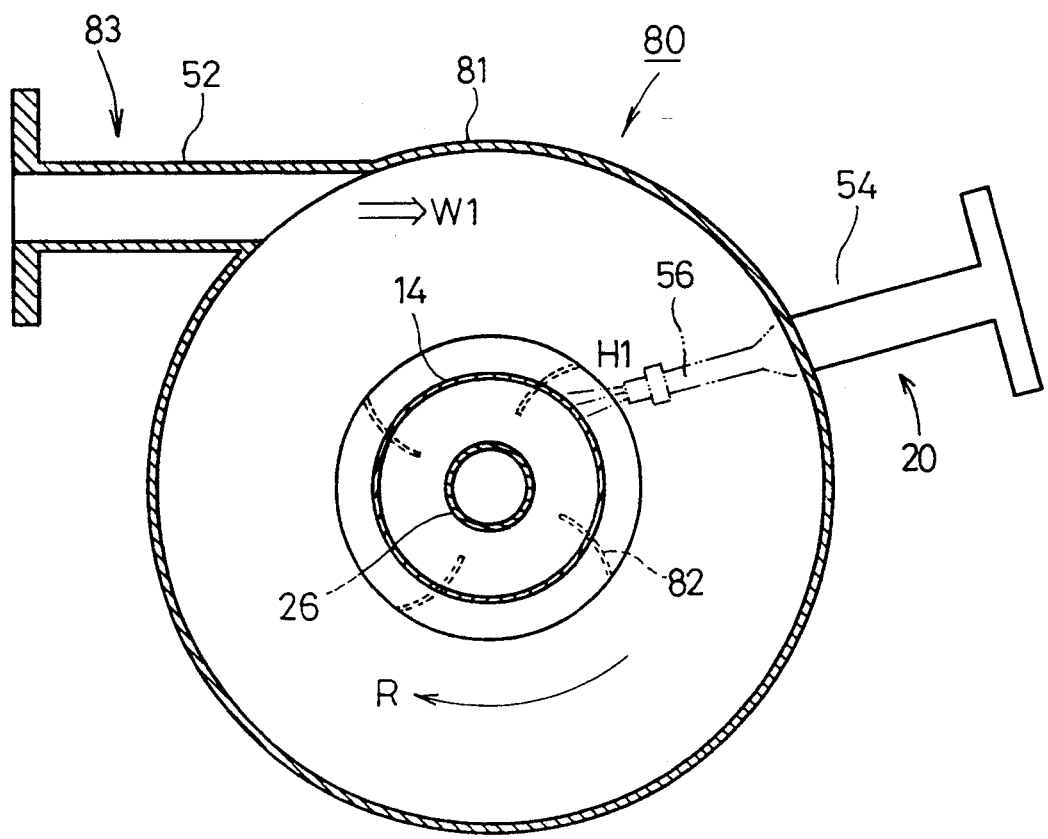
FIG. 5 is a partly-cut transverse cross-sectional view depicting the rotary filtering apparatus illustrated in FIG. 3.

As shown in FIG. 3, a rotary filtering apparatus 80 according to the present embodiment has a tank 81 having inner peripheral surfaces comprising an upper part which is cylindrical and lower part which is conical, with a diameter decreasing toward the lower end thereof. A stirrer 82 comprised of a plurality of curved and radially-arranged plates is mounted on the bottom face of a cylindrically shaped filter 14 disposed in the tank 81. The filter 14 together with the stirrer 82 is rotatable by a filter rotating mechanism 16. A pipe 52 connected with a fluid supply unit 83, supplies polluted water W1 to the tank 81, and is mounted onto the side wall of the tank 81 at a height corresponding to the height of the stirrer 82 (see FIGS. 3 through 5). A pressure gauge 84, and a hole 86 used for visibly recognizing the inside of the tank 81, etc. may be mounted to an upper portion of the tank 81. A fluid suction unit 22 has a branch pipe 88 disposed in the course of a pipe 62. Further, the fluid suction unit 22 is connected to a cistern tank 92 through a valve 90 from the branch pipe 88. A pipe 94 for discharging particles S is coupled to the lower part of the tank 81. A pump 96, which serves as a drive source for supplying the polluted water W1, and a motor 98 are provided around the side surface of the lower part of the tank 81. The rotary filtering apparatus 80 according to the present embodiment is constructed as described above. The operation of the rotary filtering apparatus 80 will now be described below.

A motor 36, with a reduction gear, rotates in the same manner as the first embodiment, and thereby the filter 14 and the stirrer 82 are rotated in the same direction. At the same time, the polluted water W1 is supplied through a pipe 52 by a pump 48 in the same direction (i.e., in the direction indicated by "R" in FIG. 5) as the rotational direction of the stirrer 82, along an inner peripheral surface of the tank 81. As a result, a centrifugal stream is produced inside the tank 81 by both the stream of polluted water W1, which has been supplied to the inside of the tank 81, and the rotation of the stirrer 82, and such a stream acts to separate the particles S from the polluted water W1. The particles S reach the side wall of the tank 81 and are displaced toward the lower end of the tank 81. The particles S are then discharged to the outside of the rotary filtering apparatus 80 through pipe 94. Further, the high-pressure water H is injected from a jet nozzle 56 through a pipe 58 by a pump 60 along a direction substantially opposite to the rotational direction of the filter 14, thereby preventing the filter 14 from being clogged. Since the jet nozzle 56 and the filter 14 are placed above the pipe 52 and the stirrer 82, the influence of the polluted water W1 on the rotational stream is negligibly small.

On the other hand, clean water W2 separated from the polluted water W1 is sucked into the filter 14 and is discharged to the outside through the pipe 62. However, the separated clean water W2 may alternatively be stored in a cistern tank 92 by opening the valve 90, and thereafter clean water may be suitably taken out from the cistern tank 92.

Thus, in the rotary filtering apparatus 80 according to the present embodiment, the polluted water W1 is supplied to the tank 81 in a tangential stream along the inner peripheral surface of the tank 81. The stirrer 82 is placed under the filter 14 and rotated in the same direction in which the polluted water W1 is supplied. Therefore, the centrifugal stream developed in the tank 81 is strong enough to reliably effect centrifugal separation.

The rotary filtering apparatus according to the present invention can bring about the following advantageous effects.

The fluid to be filtered, which is supplied from the fluid supply unit, is centrifugally rotated by action of the fluid itself and the washing fluid injected from a nozzle unit. Thus, sludge or the like contained in the fluid, whose specific gravity is heavy, is centrifugally separated from the fluid. Then, the remaining suspended particles whose specific gravity is light are filtered by the filtering member. It is therefore possible to easily and rapidly separate the particles suspended in the fluid.

Further, since any clogging of the filtering member can be avoided by the washing fluid injected toward the filtering member from the nozzle unit, and further since the filtered fluid is sucked by a fluid suction unit, it is possible to continuously separate the suspended particles from the fluid.

Further, centrifugal separation can be more strongly and reliably effected by providing a stirrer, and by rotating the stirrer in a direction in which the fluid to be filtered is centrifugally rotated.

Having now fully described the invention, it will be apparent to those skilled in the art that many changes and modification can be made without departing from the spirit or scope of the invention as set forth herein.

What is claimed is:

1. A rotary filtering apparatus for separating particles suspended in a fluid to be filtered, comprising:

a tank having inner surfaces comprising a cylindrical upper part and a lower conical part, wherein a diameter of said conical part decreases progressively toward a lower end of said tank;

a cylindrically shaped filtering member disposed centrally at a predetermined height in said upper part of said tank;

a filter rotating mechanism for rotating said filtering member in one rotational direction about a central axis of said cylindrically shaped filtering member;

a fluid supply unit for supplying the fluid to be filtered into said tank in a stream directed substantially toward said filtering member;

a nozzle unit for injecting a washing fluid into said tank in a stream substantially tangential to the cylindrical outer surface of said filtering member and in a direction substantially opposite to the rotational direction of said filtering member;

a fluid suction unit for sucking a clean fluid separated from said fluid to be filtered out of the center of said filtering member; and stirring means comprising a plurality of arcuate plates mounted on a bottom face of said cylindrically shaped filtering member and extending downwardly beneath said filtering member, wherein said fluid supply unit supplies said fluid to be filtered into said tank in a stream directed substantially tangential to an inner wall surface of said upper part of said tank.

2. An apparatus according to claim 1, wherein said fluid supply unit supplies said fluid to be filtered into said tank in a stream directed substantially in a same direction as the rotational direction of said filtering member.

3. An apparatus according to claim 1, further comprising a storage tank connected to the lower end of said tank, for storing therein the particles separated from the fluid to be filtered.

4. An apparatus according to claim 1, wherein said nozzle unit is mounted to a side wall of said tank at a height substantially the same as said predetermined height at which said filtering member is installed within said tank, and higher than a height at which said stirring means is installed.

5. A rotary filtering apparatus for separating particles suspended in a fluid to be filtered, comprising:
- a tank having inner surfaces comprising a cylindrical upper part and a lower conical part, wherein a diameter of said conical part decreases progressively toward a lower end of said tank;
- a cylindrically shaped filtering member disposed centrally at a predetermined height in said upper part of said tank;
- a filter rotating mechanism for rotating said filtering member in one rotational direction about a central axis of said cylindrically shaped filtering member;
- a fluid supply unit for supplying the fluid to be filtered into said tank in a stream directed substantially toward said filtering member;
- a nozzle unit for injecting a washing fluid into said tank in a stream substantially tangential to the cylindrical outer surface of said filtering member and in a direction substantially opposite to the rotational direction of said filtering member; and
- a fluid suction unit for sucking a clean fluid separated from said fluid to be filtered out of the center of said filtering member, said suction unit comprising a pipe disposed on said central axis of said filtering member, said pipe being rotatable together with said filtering member, said pipe having at least one aperture therein located inside said filtering member through which said clean fluid is drawn;

wherein said fluid supply unit supplies said fluid to be filtered into said tank in a stream substantially tangential to a cylindrical outer surface of said filtering member and in a direction opposite to the rotation direction of said filtering member.

6. An apparatus according to claim 5, further comprising a storage tank connected to the lower end of said tank, for storing therein the particles separated from the fluid to be filtered.

7. An apparatus according to claim 5, wherein said nozzle unit is mounted to a side wall of said tank at a height substantially the same as said predetermined height at which said filtering member is installed within said tank.

* * * * *